United States Patent
Emoto et al.

(10) Patent No.: US 8,163,332 B2
(45) Date of Patent: Apr. 24, 2012

(54) ELECTRODE MANUFACTURING APPARATUS AND ELECTRODE MANUFACTURING METHOD

(75) Inventors: Kazutoshi Emoto, Tokyo (JP); Katsuo Naoi, Tokyo (JP); Kiyonori Hinoki, Tokyo (JP); Masayoshi Hirano, Tokyo (JP)

(73) Assignee: TDK Corporation, Tokyo (JP)

( * ) Notice: Subject to any disclaimer, the term of this patent is extended or adjusted under 35 U.S.C. 154(b) by 456 days.

(21) Appl. No.: 12/560,955

(22) Filed: Sep. 16, 2009

(65) Prior Publication Data
US 2010/0075023 A1    Mar. 25, 2010

(30) Foreign Application Priority Data

Sep. 24, 2008 (JP) ................. P2008-244668
Jul. 9, 2009 (JP) ................. P2009-162907

(51) Int. Cl.
*H01M 4/02* (2006.01)
*H01M 4/04* (2006.01)
*H01M 4/64* (2006.01)
*H01M 4/70* (2006.01)
*H01M 4/13* (2010.01)
*H01M 4/131* (2010.01)

(52) U.S. Cl. ......... 427/123; 427/58; 427/79; 427/126.1; 427/126.3; 427/126.4; 427/126.6; 427/256; 427/271; 427/277; 427/278; 427/428.01; 427/428.21; 118/200; 118/209; 118/244; 118/248; 118/250; 118/251; 118/410; 118/419; 118/424; 118/304; 118/400; 118/407; 118/423; 118/300; 29/730; 29/623.1; 29/623.5; 29/2

(58) Field of Classification Search ................ None
See application file for complete search history.

(56) References Cited

U.S. PATENT DOCUMENTS 6,306,215 B1 * 10/2001 Larkin .................. 118/249

FOREIGN PATENT DOCUMENTS

CN      2629843 Y    8/2004
JP      A-11-111272  4/1999

* cited by examiner

*Primary Examiner* — Nathan Empie
*Assistant Examiner* — Lisha Jiang
(74) *Attorney, Agent, or Firm* — Oliff & Berridge, PLC

(57) ABSTRACT

An electrode manufacturing apparatus comprises a conveying section for conveying a current collector sheet having a plurality of through holes; a backup roll for guiding the conveyed current collector sheet; an applicator for supplying a coating liquid to the current collector sheet on the backup roll; and a nip roll for pressing a part of the current collector sheet where the coating liquid is not supplied yet from the applicator against the backup roll.

3 Claims, 2 Drawing Sheets

ELECTRODE MANUFACTURING APPARATUS AND ELECTRODE MANUFACTURING METHOD

BACKGROUND OF THE INVENTION

1. Field of the Invention

The present invention relates to an electrode manufacturing apparatus and an electrode manufacturing method.

2. Related Background Art

An electrode has been known in which a plurality of through holes are formed in a current collector in order to enhance the mobility of electrolyte ions and electrolytic solutions (see, for example, Japanese Patent Application Laid-Open No. 11-111272). For manufacturing such an electrode, a coating liquid for forming an electrode is required to be applied onto a current collector sheet having a plurality of through holes.

As an example of methods for applying a coating liquid onto a current collector sheet, it has been known to supply a coating liquid to the current collector sheet guided on a backup roll as disclosed in the Patent Literature.

SUMMARY OF THE INVENTION

When applied to the current collector sheet having a plurality of through holes, however, the coating liquid may reach the rear face through the through holes, thereby unevenly remaining on the backup roll. As a consequence, subsequently supplied uncoated current collector sheets may incur uneven surface heights or their rear faces may bear flecks of coating liquid films, thus making it hard to form electrodes with favorable planarity.

In view of the problem mentioned above, it is an object of the present invention to provide an electrode manufacturing apparatus and electrode manufacturing method which can achieve an electrode having a current collector with a plurality of through holes and exhibiting favorable planarity.

The electrode manufacturing apparatus in accordance with the present invention comprises a conveying section for conveying a current collector sheet having a plurality of through holes, a backup roll for guiding the conveyed current collector sheet, an applicator for supplying a coating liquid to the current collector sheet on the backup roll, and a nip roll for pressing a part of the current collector sheet where the coating liquid is not supplied yet from the applicator, against the backup roll.

The electrode manufacturing method in accordance with the present invention comprises a coating step of supplying a coating liquid to a current collector sheet having a plurality of through holes guided on a backup roll and a pressing step of pressing a part of the current collector sheet where the coating liquid is not supplied yet, against the backup roll.

In the present invention, though the coating liquid remaining on the surface of the backup roll after reaching the rear face of a current collector sheet through the through holes may come into contact with an uncoated current collector sheet on the backup roll, the nip roll presses the current collector sheet against the backup roll, whereby the remaining coating liquid can be pushed out from the rear face of the current collector sheet into the through holes. Therefore, the uncoated current collector sheet can be brought into close contact with the backup roll.

Preferably, in the electrode manufacturing method, a circumferential speed of the surface of the backup roll differs from a conveying speed of the current collector sheet. Preferably, in the electrode manufacturing method, the circumferential speed of the surface of the backup roll is made different from the speed of the current collector sheet guided on the backup roll.

In this case, the moving speed of the surface of the backup roll differs from that of the current collector sheet, thereby causing a shear effect which further enhances the effect of pushing the coating liquid remaining on the backup roll into the through holes of the current collector sheet.

Preferably, the nip roll presses the current collector sheet at a linear pressure of $20 \times 10^3$ N/m to $600 \times 10^3$ N/m.

In this case, the surface of the current collector sheet to be coated with the coating liquid after pushing the coating liquid remaining on the backup roll into the through holes by the shear effect etc. is easier to keep its smoothness, whereby the effect of improving the planarity further increases.

The present invention provides an electrode manufacturing apparatus and electrode manufacturing method which can achieve an electrode having a current collector with a plurality of through holes and favorable planarity.

DESCRIPTION OF THE PREFERRED EMBODIMENTS

In the following, preferred embodiments of the electrode manufacturing apparatus and electrode manufacturing method in accordance with the present invention will be explained in detail with reference to the drawings. In the following explanation, the same or equivalent parts will be referred to with the same signs while omitting their overlapping descriptions.

Figure 1:
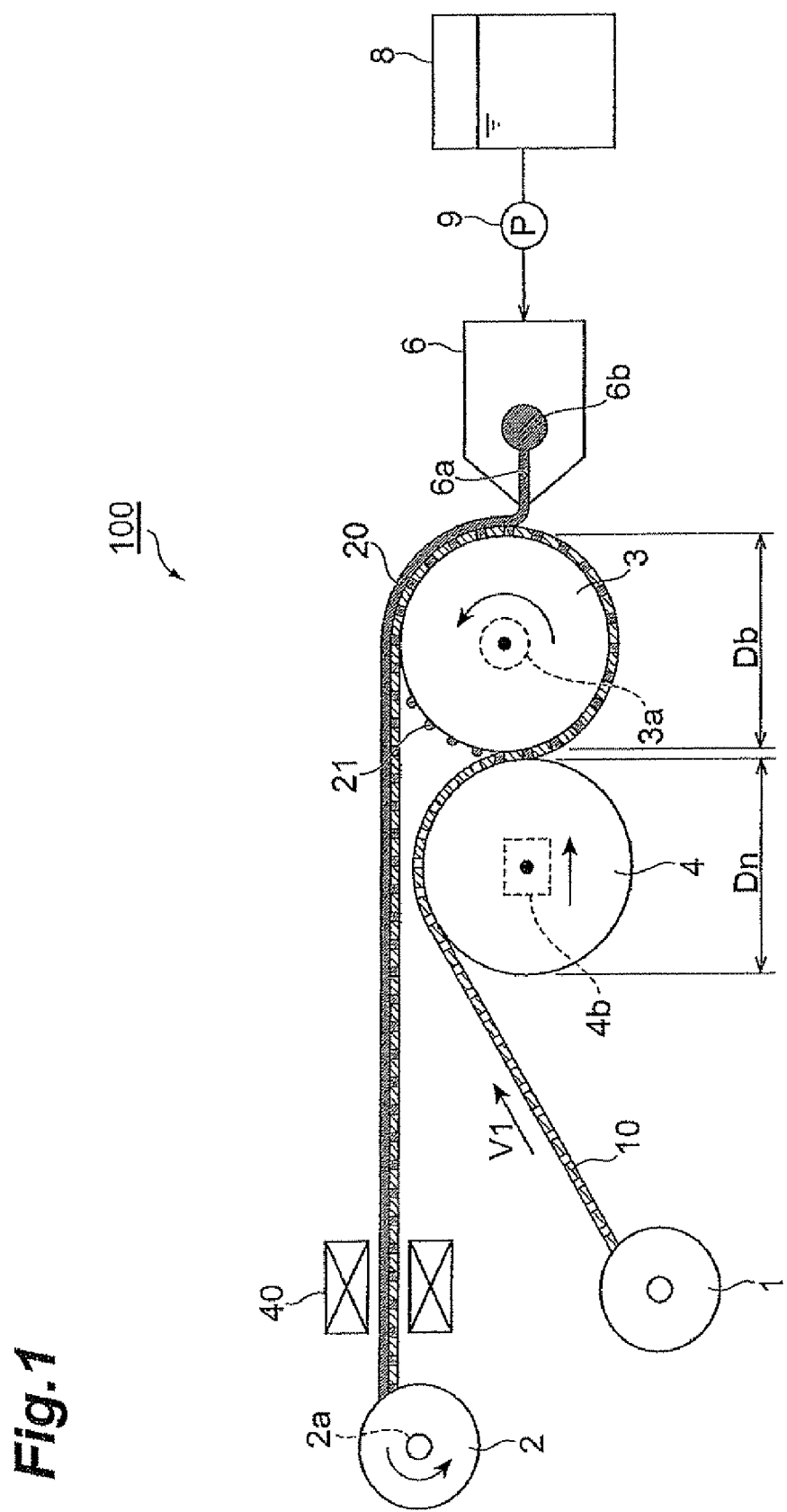
FIG. 1 is a schematic structural view of the electrode manufacturing apparatus in accordance with an embodiment.

As illustrated in FIG. 1, an electrode manufacturing apparatus 100 of the present invention mainly comprises a coating liquid tank 8, a liquid supply pump 9, a slit die (liquid applicator) 6, a current collector sheet supply reel 1, a backup roll 3, a nip roll 4, a take-up reel 2, and a dryer 40.

The coating liquid tank 8 retains a coating liquid to be applied to electrodes. The liquid is not limited in particular as long as it is a coating liquid for forming an active material layer of an electrochemical device. Its examples include those containing an active material, a binder, and a solvent, and may further contain additives such as a conductive auxiliary when necessary.

As the active material, various known materials for electrochemical devices can be used. Their examples include carbon materials such as graphite, non-graphitizable carbon, graphitizable carbon, and low-temperature-fired carbon; metals such as Al, Si, and Sn; oxides such as $SiO_2$ and $SnO_2$; and lithium-containing metal oxides such as lithium titanate ($Li_4Ti_5O_{12}$), $LiCoO_2$, $LiNi_xCo_{1-x}O_2$, $LiMn_2O_4$, and $LiCo_xNi_yCo_{1-x-y}O_2$.

Examples of the binder include polymers of fluororesins such as PVDF, PTFE, FEP, PFA, ETFE, PCTFE, ECTFE, and PVF.

Examples of the solvent include N-methyl-2-pyrrolidone and N,N-dimethylformamide.

Examples of the conductive auxiliary include carbon materials such as carbon blacks; fine powders of metals such as copper, nickel, stainless steel, and iron; and conductive oxides such as ITO.

Though not restricted in particular, the viscosity of the coating liquid is preferably within the range of 100 to 300 P, for example.

The coating liquid tank 8 and the slit die 6 are connected to each other with a line L1. A pump 9 for quantitatively supplying the liquid from the coating liquid tank 8 to the slit die 6 is connected to the line L1. Though not restrictive in particular, a precision gear pump, for example, can be used for the pump 9.

The take-up reel 2 takes up a current collector sheet 10 supplied from the current collector sheet supply reel 1, thereby conveying the current collector sheet 10. A motor 2a is connected to the take-up reel 2, so as to allow the latter to take up the current collector sheet 10 at a fixed line speed (linear speed). Here, the take-up reel 2 and the motor 2 constitute a conveying section. Though not restricted in particular, the line speed V1 may be 1 m/min to 25 m/min, for example, preferably 2 m/min to 20 m/min, more preferably 5 m/min to 10 m/min. Irregularities are easier to occur in the width direction of the current collector sheet 10 when V1 is too low, whereas the coated film surface is more likely to incur damages when V1 is too high.

The current collector sheet 10 is not restricted in particular as long as it is a sheet of a conductive body having a plurality of through holes. Examples of its materials include metal materials such as aluminum, copper, and nickel. The mode of through holes is not limited in particular. For example, a so-called punching metal sheet in which a number of holes having a predetermined shape (e.g., circular or polygonal shape) are formed into a zigzag alignment or parallel alignment by pressing or an expanded metal sheet in which a sheet formed with zigzag cut lines is expanded so as to form a number of substantially rhombic through holes can be used. Though the number and diameter of through holes are not restricted in particular, the diameter may be 10 to 500 μm, for example.

The thickness and width of the current collector sheet 10, which are not limited in particular, may be 10 to 30 μm and 50 to 2000 mm, respectively.

The backup roll 3 is a rotatable cylindrical roll. The current collector sheet 10, which is supplied from the current collector sheet supply reel 1 and taken up by the take-up reel 2, is hung about the peripheral face of the backup roll 3, so as to be guided thereby. Though the diameter of the backup roll 3 is not restricted in particular, its outer diameter may be 10 to 250 mm, for example. The backup roll 3 can be rotated at a desirable speed with a motor 3a when necessary. Though not limited in particular, the rotational speed of the backup roll 3 is preferably set such that the linear speed Vb on the peripheral face of the backup roll 3 is the same as or higher than the line speed V1 of the current collector sheet 10. Specifically, it will be preferred if $1.0V1 \leq Vb \leq 1.3V1$.

The slit die (applicator) 6 has a slit 6a which opens along the axial direction of the backup roll 3. The liquid flowing from the line L1 into the slit die 6 is widened in the width direction of the current collector sheet 10 by a manifold 6b, which is provided as a void within the slit die 6 and extends in the axial direction of the backup roll 3, and then is expelled like a sheet through the slit 6a. Though not restricted in particular, the thickness of the coating film may be 50 to 200 μm, for example.

The nip roll 4 is arranged parallel to the axis of the backup roll 3 and positioned more upstream side in the conveying direction of the current collector sheet 10 than the slit die 6, around the backup roll 3. The nip roll 4 is placed above the backup roll 3 and presses the current collector sheet 10 against the backup roll 3 with a known pressing means (ex. spring etc.) 4b before the slit die 6 applies the coating liquid to the current collector sheet 10.

Though not limited in particular, the linear pressure at which the nip roll 4 presses the current collector sheet 10 is preferably $20 \times 10^3$ N/m to $600 \times 10^3$ N/m, more preferably $50 \times 10^3$ N/m to $300 \times 10^3$ N/m.

Though not restricted in particular, the ratio of the diameter Dn of the nip roll 4 to the diameter Db of the backup roll 3, i.e., Dn/Db, is preferably within the range of 96% to 300%, more preferably within the range of 98% to 120%. The Dn/Db falling within such a range can inhibit minute roll deformations from occurring when the backup roll 3 and nip roll 4 are pressed against each other, thereby reducing fluctuations in the coating film thickness.

The dryer 40 dries a liquid film 20 on the current collector sheet 10. Examples of the dryer include hot-wire heaters, steam heaters, and infrared heaters.

In thus constructed electrode manufacturing apparatus 100, the liquid supplied from the coating liquid tank 8 to the slit die 6 by the liquid supply pump 9 is expelled through the manifold 6b and slit 6a, so as to be applied as the sheet-like liquid film 20 onto the current collector sheet 10 guided on the backup roll 3.

Figure 2:
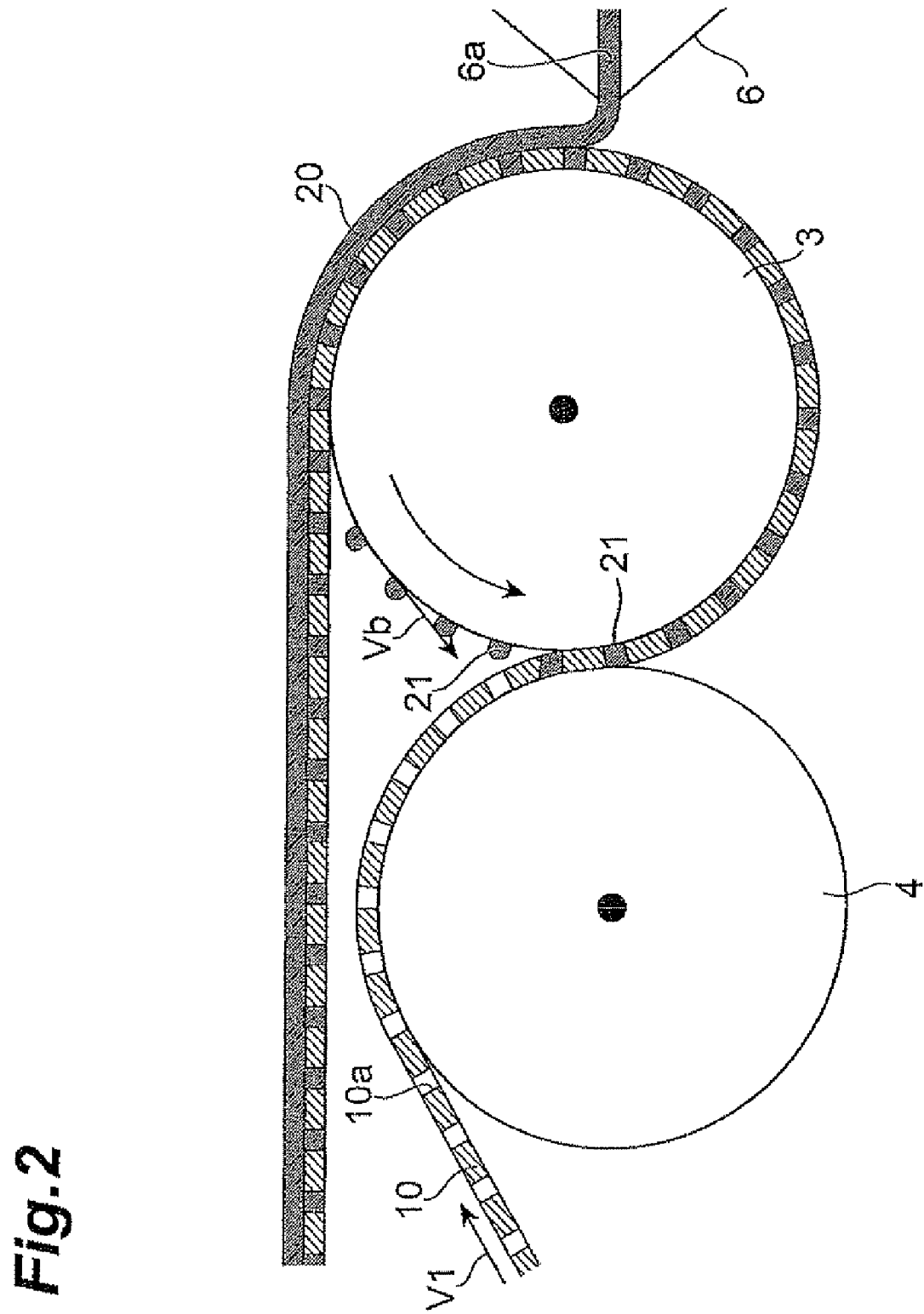
FIG. 2 is an enlarged sectional view of a part in the vicinity of a backup roll in FIG. 1.

Though the coating liquid 21 having reached the rear side of the current collector sheet 10 through the through holes 10a and remaining on the surface of the backup roll 3 may come into contact with the uncoated current collector sheet 10 on the backup roll 3 as illustrated in FIG. 2, the nip roll 4 presses the current collector sheet 10 against the backup roll 3, whereby the remaining coating liquid 21 can be pushed out into the through holes 10a from the rear face of the current collector sheet 10 in this embodiment. Therefore, the current collector sheet 10 before being coated with the coating liquid can be brought into close contact with the backup roll 3.

This makes it easy to smooth the surface of the current collector sheet 10 on the backup roll 3 and achieve a uniform thickness in the coating liquid supplied from the slit die 6. This can form an electrode having favorable planarity without unevenness and the like. Though not depicted in FIG. 2, a very thin coating film having a substantially uniform thickness is typically formed on the rear face of the current collector sheet 10.

When the line speed V1 of the current collector sheet 10 and the linear speed Vb of the surface of the backup roll 3 are made different from each other, shear occurs between the current collector sheet 10 and the backup roll 3, thereby making it further easier for the nip roll 4 to push out the remaining coating liquid 21 into the through holes 10a.

The present invention can be modified in various ways without being restricted to the above-mentioned embodiment.

For example, though the above-mentioned embodiment employs a slit die as the applicator, the present invention can also be carried out by using other coating methods such as those with premetering roll coaters. The conveying section may adopt any mode.

EXAMPLES

Example 1

Using a backup roll having a diameter Db of 120.0 mm, a nip roll having a diameter Dn of 120.0 mm, and a slit die having a slit width of 300 μm, a coating liquid was applied to a surface of a punching current collector sheet made of Al having a thickness of 20 μm and a width of 150 mm and including through holes, each having a diameter of 200 μm, arranged in a zigzag alignment with a center pitch of 200 μm.

Here, the coating liquid was prepared by dispersing 50 parts by weight of a powder in which the mass ratio of the active material ($LiCo_{0.33}Ni_{0.33}Mn_{0.34}O$)/binder (PVdF)/conductive auxiliary (acetylene black) was 80:10:10 into 50 parts by weight of N-methyl-2-pyrollidone acting as a solvent. The viscosity was 270 P. The line speed Vl of the current collector sheet 10 was 1.00 m/min, while the linear speed Vb of the backup roll 3 was 1.10 m/min. The coating liquid was supplied such that the liquid film attained a thickness of 120 μm. The planarity of the electrode after drying was studied with a microscope and a micrometer.

Examples 2 to 37 and Comparative Example 1

The procedure of Example 1 was carried out except that Vb, Vl, the linear pressure by the nip roll, and Db were changed as listed in Tables 1 and 2.

Each of the examples pressed with the nip roll was able to improve the planarity of the electrode. The planarity was high in particular in Examples 3 to 7, 10 to 12, 20 to 23, and 32 to 35.

TABLE 1

| | Vb (m/min) | Vl (m/min) | Vb/Vl (%) | Nip roll linear pressure (×10³ N/m) | Dn (mm) | Db (mm) | Dn/Db (%) | Fluctuation in thickness (±%) @900[mm]X60 [mm], n = 100, measured by micrometer | Determination |
|---|---|---|---|---|---|---|---|---|---|
| Example 1 | 1.10 | 1.00 | 110 | 200 | 120 | 120 | 100 | 5.42 | Though a rough surface exists at a widthwise end part, smoothness is generally fine (within ±6%). |
| Example 2 | 2.20 | 2.00 | 110 | 200 | 120 | 120 | 100 | 3.40 | Though a rough surface slightly exists at a widthwise end part, smoothness is generally fine (within ±4%). |
| Example 3 | 5.50 | 5.00 | 110 | 200 | 120 | 120 | 100 | 1.18 | Smoothness is very fine (within ±2%). |
| Example 4 | 8.80 | 8.00 | 110 | 200 | 120 | 120 | 100 | 1.15 | Smoothness is very fine (within ±2%). |
| Example 5 | 11.00 | 10.00 | 110 | 200 | 120 | 120 | 100 | 1.20 | Smoothness is very fine (within ±2%). |
| Example 6 | 16.50 | 15.00 | 110 | 200 | 120 | 120 | 100 | 1.38 | Smoothness is very fine (within ±2%). |
| Example 7 | 22.00 | 20.00 | 110 | 200 | 120 | 120 | 100 | 1.41 | Smoothness is very fine (within ±2%). |
| Example 8 | 27.50 | 25.00 | 110 | 200 | 120 | 120 | 100 | 3.86 | Though a slight damage is seen on the surface, smoothness is generally fine (within ±4%). |
| Example 9 | 7.60 | 8.00 | 95 | 200 | 120 | 120 | 100 | 5.26 | Though a damage is seen on the surface, smoothness is generally fine (within ±6%). |
| Example 10 | 8.00 | 8.00 | 100 | 200 | 120 | 120 | 100 | 1.46 | Smoothness is very fine (within ±2%). |
| Example 11 | 9.60 | 8.00 | 120 | 200 | 120 | 120 | 100 | 1.34 | Smoothness is very fine (within ±2%). |
| Example 12 | 10.40 | 8.00 | 130 | 200 | 120 | 120 | 100 | 1.38 | Smoothness is very fine (within ±2%). |
| Example 13 | 10.80 | 8.00 | 135 | 200 | 120 | 120 | 100 | 5.27 | Though a damage is seen on the surface, smoothness is generally fine (within ±6%). |
| Example 14 | 8.80 | 8.00 | 110 | 850 | 120 | 120 | 100 | 5.67 | Though irregularities exist in a collector hole part and a damage is partly seen, smoothness is generally fine (within ±6%). |
| Example 15 | 8.80 | 8.00 | 110 | 800 | 120 | 120 | 100 | 4.78 | Though irregularities exist in a collector hole part and a damage is partly seen, smoothness is generally fine (within ±6%). |
| Example 16 | 8.80 | 8.00 | 110 | 650 | 120 | 120 | 100 | 4.22 | Though irregularities exist in a collector hole part and a damage is partly seen, smoothness is generally fine (within ±6%). |
| Example 17 | 8.80 | 8.00 | 110 | 600 | 120 | 120 | 100 | 3.58 | Though slight irregularities exist in a collector hole part, smoothness is generally fine (within ±4%). |
| Example 18 | 8.80 | 8.00 | 110 | 500 | 120 | 120 | 100 | 2.89 | Though slight irregularities exist in a collector hole part, smoothness is generally fine (within ±4%) |
| Example 19 | 8.80 | 8.00 | 110 | 400 | 120 | 120 | 100 | 2.45 | Though slight irregularities exist in a collector hole part, smoothness is generally fine (within ±4%) |

TABLE 2

| | Vb (m/min) | Vl (m/min) | Vb/Vl (%) | Nip roll linear pressure (×10³ N/m) | Dn (mm) | Db (mm) | Dn/Db (%) | Fluctuation in thickness (±%) @900[mm]X60 [mm], n = 100, measured by micrometer | Determination |
|---|---|---|---|---|---|---|---|---|---|
| Example 20 | 8.80 | 8.00 | 110 | 300 | 120 | 120 | 100 | 1.26 | Smoothness is very fine (within ±2%). |
| Example 21 | 8.80 | 8.00 | 110 | 200 | 120 | 120 | 100 | 1.18 | Smoothness is very fine (within ±2%). |
| Example 22 | 8.80 | 8.00 | 110 | 100 | 120 | 120 | 100 | 1.24 | Smoothness is very fine (within ±2%). |
| Example 23 | 8.80 | 8.00 | 110 | 50 | 120 | 120 | 100 | 1.45 | Smoothness is very fine (within ±2%). |
| Example 24 | 8.80 | 8.00 | 110 | 40 | 120 | 120 | 100 | 2.79 | Though slight irregularities exist in a collector hole part, smoothness is generally fine (within ±4%). |
| Example 25 | 8.80 | 8.00 | 110 | 30 | 120 | 120 | 100 | 3.66 | Though slight irregularities exist in a collector hole part, smoothness is generally fine (within ±4%). |
| Example 26 | 8.80 | 8.00 | 110 | 20 | 120 | 120 | 100 | 3.96 | Though slight irregularities exist in a collector hole part, smoothness is generally fine (within ±4%). |

TABLE 2-continued

| | Vb (m/min) | Vl (m/min) | Vb/Vl (%) | Nip roll linear pressure (×10³ N/m) | Dn (mm) | Db (mm) | Dn/Db (%) | Fluctuation in thickness (±%) @900[mm]X60 [mm], n = 100, measured by micrometer | Determination |
|---|---|---|---|---|---|---|---|---|---|
| Example 27 | 8.80 | 8.00 | 110 | 15 | 120 | 120 | 100 | 5.48 | Though irregularities exist in a collector hole part and a damage is partly seen, smoothness is generally fine (within ±6%). |
| Example 28 | 8.80 | 8.00 | 110 | 200 | 120 | 35 | 343 | 4.68 | Though thickness fluctuates, smoothness is generally fine (within ±6%). |
| Example 29 | 8.80 | 8.00 | 110 | 200 | 120 | 40 | 300 | 2.97 | Though thickness slightly fluctuates, smoothness is generally fine (within ±4%). |
| Example 30 | 8.80 | 8.00 | 110 | 200 | 120 | 60 | 200 | 3.20 | Though thickness slightly fluctuates, smoothness is generally fine (within ±4%). |
| Example 31 | 8.80 | 8.00 | 110 | 200 | 120 | 80 | 150 | 3.18 | Though thickness slightly fluctuates, smoothness is generally fine (within ±4%). |
| Example 32 | 8.80 | 8.00 | 110 | 200 | 120 | 100 | 120 | 1.52 | Smoothness is very fine (within ±2%). |
| Example 33 | 8.80 | 8.00 | 110 | 200 | 120 | 118 | 102 | 1.12 | Smoothness is very fine (within ±2%). |
| Example 34 | 8.80 | 8.00 | 110 | 200 | 120 | 120 | 100 | 1.08 | Smoothness is very fine (within ±2%). |
| Example 35 | 8.80 | 8.00 | 110 | 200 | 120 | 122 | 98 | 1.15 | Smoothness is very fine (within ±2%). |
| Example 36 | 8.80 | 8.00 | 110 | 200 | 120 | 125 | 96 | 3.96 | Though thickness slightly fluctuates, smoothness is generally fine (within ±4%). |
| Example 37 | 8.80 | 8.00 | 110 | 200 | 120 | 130 | 92 | 5.27 | Though thickness fluctuates, smoothness is generally fine (within ±6%). |
| Comparative Example 1 | 8.80 | 8.00 | 110 | no nip roll | — | 100 | — | 10.53 | Smoothness is poor. |

What is claimed is:

1. An electrode manufacturing method comprising:
a coating step of supplying a coating liquid to a current collector sheet having a plurality of through holes guided on a backup roll; and
a pressing step of pressing a part of the current collector sheet where the coating liquid is not supplied yet, against the backup roll with a nip roll, wherein the pressing fills the plurality of through holes with the coating liquid and the pressing step is different from the coating step.

2. An electrode manufacturing method according to claim 1, wherein a circumferential speed of a surface of the backup roll is made different from a speed of the current collector sheet guided on the backup roll.

3. An electrode manufacturing method according to claim 1, wherein the nip roll presses the current collector sheet at a linear pressure of $20 \times 10^3$ N/m to $600 \times 10^3$ N/m.

* * * * *